United States Patent
Liu

(10) Patent No.: US 11,546,854 B2
(45) Date of Patent: Jan. 3, 2023

(54) COMMUNICATION METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/037,578

(22) Filed: Sep. 29, 2020

(65) Prior Publication Data
US 2021/0014793 A1   Jan. 14, 2021

Related U.S. Application Data

(63) Continuation of application No. PCT/CN2018/082006, filed on Apr. 4, 2018.

(51) Int. Cl.
*H04W 52/02*   (2009.01)
*H04W 4/02*    (2018.01)
(Continued)

(52) U.S. Cl.
CPC ......... *H04W 52/0235* (2013.01); *H04W 4/02* (2013.01); *H04W 8/18* (2013.01);
(Continued)

(58) Field of Classification Search
CPC ..... H04W 52/0235; H04W 4/02; H04W 8/18; H04W 8/245; H04W 28/0268;
(Continued)

(56) References Cited

U.S. PATENT DOCUMENTS

2013/0227120 A1* 8/2013 Yu .................. H04M 15/83
709/224
2013/0308513 A1* 11/2013 Jheng .............. H04W 52/0216
370/311
(Continued)

FOREIGN PATENT DOCUMENTS

CN   101461192 A   6/2009
CN   102421166 A   4/2012
(Continued)

OTHER PUBLICATIONS

"3rd Generation Partnership Project; Technical Specification Group Services and System Aspects; Study on system impacts of extended Discontinuous Reception (DRX) cycle for power consumption optimization (Relase 13)", 3GPP Standard; Technical Report; 3GPP TR 23.770, 3rd Generation Partnership Project (3GPP), Mobile Competence Centre; 650, Route Des Lucioles; F-06921 Sophia-Antipolis Cedex; France, vol. SA WG2, No. V13.0.0, Sep. 21, 2015, pp. 1-42, XP051294312, 5.6.

(Continued)

*Primary Examiner* — Inder P Mehra
(74) *Attorney, Agent, or Firm* — Perkins Coie LLP

(57) ABSTRACT

Embodiments of the present application provide a communication method, a network device, and a terminal device. The method comprises: the network device determines configuration information for power saving of the terminal device according to characteristic information of the terminal device; the network device sends the configuration information to the terminal device.

20 Claims, 3 Drawing Sheets

200

A network device determines, according to characteristic information of a terminal device, configuration information for power saving of the terminal device — S210

The network device sends the configuration information to the terminal device — S220

(51) Int. Cl.
*H04W 8/18* (2009.01)
*H04W 8/24* (2009.01)
*H04W 28/02* (2009.01)
*H04W 76/28* (2018.01)

(52) U.S. Cl.
CPC ....... *H04W 8/245* (2013.01); *H04W 28/0268* (2013.01); *H04W 76/28* (2018.02)

(58) Field of Classification Search
CPC . H04W 76/28; H04W 4/025; H04W 52/0212; H04W 52/0216; H04W 52/0229; H04W 52/02; H04W 52/0258; Y02D 30/70
USPC .......................................................... 370/311
See application file for complete search history.

(56) References Cited

U.S. PATENT DOCUMENTS

| | | | |
|---|---|---|---|
| 2015/0098387 | A1 | 4/2015 | Garg et al. |
| 2015/0282145 | A1 | 10/2015 | Kim et al. |
| 2016/0073284 | A1 | 3/2016 | Qian et al. |
| 2018/0217654 | A1* | 8/2018 | Zou .......................... G06F 1/329 |
| 2019/0207811 | A1* | 7/2019 | Wang ................. H04L 41/0853 |
| 2021/0014791 | A1 | 1/2021 | Freda |

FOREIGN PATENT DOCUMENTS

| | | | | |
|---|---|---|---|---|
| CN | 102932881 | A | 2/2013 | |
| CN | 104145509 | A | 11/2014 | |
| CN | 107258107 | A | 10/2017 | |
| CN | 107306442 | A | 10/2017 | |
| EP | 2 846 589 | A1 * | 3/2015 | |
| EP | 2846589 | A1 * | 3/2015 | ........ H04W 52/0216 |
| EP | 2846589 | A1 | 3/2015 | |
| KR | 20150127451 | A | 11/2015 | |
| TW | I364931 | B | 5/2012 | |
| WO | 2016148752 | A1 | 9/2016 | |
| WO | WO 2016/148752 | * | 9/2016 | |
| WO | WO-2016148752 | A1 * | 9/2016 | ........ H04W 52/0216 |
| WO | 2018031327 | A1 | 2/2018 | |

OTHER PUBLICATIONS

Supplementary European Search Report in the European application No. 18913800.1, dated Feb. 17, 2021.
International Search Report in the international application No. PCT/CN2018/082006, dated Jan. 8, 2019.
3rd Generation Partnership Project; Technical Specification Group Radio Access Network; Evolved Universal Terrestrial Radio Access (E-UTRA); User Equipment (UE) procedures in idle mode (Release 13), 3GPP TS 36.304 V13.0.0 (Dec. 2015), section 7.
3rd Generation Partnership Project; Technical Specification Group Services and System Aspects; System Architecture for the 5G System; Stage 2 (Release 15), 3GPP TS 23.501 V1.0.0 (Jun. 2017), section 5.3.3.2.5.
SA WG2; "Presentation of TR 23.501: System Architecture for the 5G System (Release 15) to TSG SA for Approval", 3GPP TSG SA Meeting #76, TD SP-170384, Jun. 7-9, 2017, West Palm Beach, Florida, USA.
Written Opinion of the International Search Authority in the international application No. PCT/CN2018/082006, dated Jan. 8, 2019.
First Office Action of the Japanese application No. 2020-553497, dated Feb. 4, 2022. 8 pages with English translation.
Notice of Hearing of the Indian application No. 202027047811, issued on Mar. 30, 2022. 4 pages with English translation.
First Office Action of the European application No. 18913800.1, dated Nov. 26, 2021 (5 pages).
First Office Action of the Korean application No. 10-2020-7031765, dated Jan. 3, 2022 (12 pages).
Office Action of the Indian application No. 202027047811, dated Dec. 6, 2021 (8 pages).
First Office Action of the Canadian application No. 3095648, dated Oct. 18, 2021 (4 pages).
First Office Action of the Chinese application No. 202011593352.4, dated Jun. 6, 2022. 16 pages with English translation.
First Office Action of the Taiwanese application No. 108112033, dated May 30, 2022. 12 pages with English Translation.
Notice of Allowance of the Korean application No. 10-2020-7031765, dated Jul. 26, 2022. 3 pages with English Translation.
Notice of Oral Examination of the European application No. 18913800.1, issued on Jun. 14, 2022. 7 pages.
Second Office Action of the Canadian application No. 3095648, dated Jul. 28, 2022. 4 pages.
Second Office Action of the Japanese application No. 2020-553497, dated Aug. 23, 2022. 8 pages with English translation.
Second Office Action of the Chinese application No. 202011593352.4, dated Sep. 23, 2022. 14 pages with English translation.

* cited by examiner

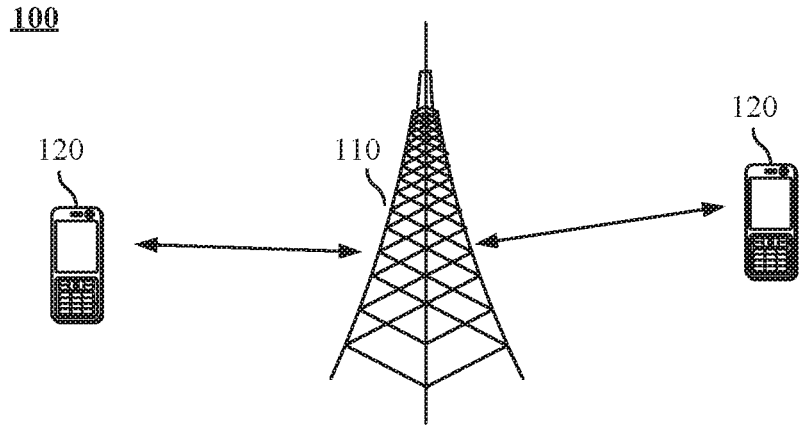

| A network device determines, according to characteristic information of a terminal device, configuration information for power saving of the terminal device | S210 |

| The network device sends the configuration information to the terminal device | S220 |

| A terminal device receives, from a network device, configuration information for power saving of the terminal device, wherein the configuration information is determined by the network device according to characteristic information of the terminal device | S310 |

| The terminal device performs data transmission according to the configuration information | S320 |

FIG. 3

COMMUNICATION METHOD, NETWORK DEVICE, AND TERMINAL DEVICE

CROSS REFERENCE TO RELATED APPLICATION

This application is a continuation application of International application No. PCT/CN2018/082006, filed on Apr. 4, 2018 and entitled "COMMUNICATION METHOD, NETWORK DEVICE, AND TERMINAL DEVICE", the disclosure of which is hereby incorporated by reference in its entirety.

TECHNICAL FIELD

The disclosure relates to the field of communication, and more particularly to a method for communication, a network device and a terminal device.

BACKGROUND

In an existing system, there are several power-saving modes for a terminal device, for example, a discontinuous reception (DRX) mode, an extended discontinuous reception (eDRX) mode, and a power saving management (PSM) mode. Configuration of a power-saving mode used by a terminal device may be determined through negotiation between a network device and the terminal device. However, the configuration of the power-saving mode determined by negotiation may not satisfy requirements of the terminal device. Therefore, how to determine configuration of a power-saving mode of a terminal device is a question worth studying.

BRIEF DESCRIPTION OF THE DRAWINGS

FIG. 1 illustrates a schematic diagram of a communication system to which embodiments of the disclosure are applicable.

FIG. 2 illustrates an exemplary flowchart of a method for communication according to an embodiment of the disclosure.

FIG. 3 illustrates an exemplary flowchart of a method for communication according to another embodiment of the disclosure.

DETAILED DESCRIPTION

Figure 4:
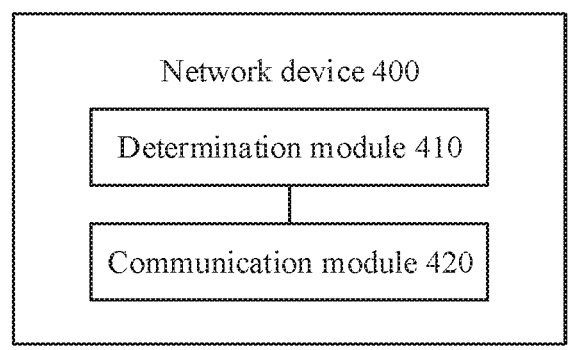
FIG. 4 illustrates an exemplary block diagram of a network device according to an embodiment of the disclosure.

Technical solutions of the embodiments of the disclosure will be described in conjunction with the accompanying drawings.

The technical solution according to the embodiments of the disclosure may be applied to various communication systems, for example, a global system for mobile communications (GSM) system, a code division multiple access (CDMA) system, a wideband code division multiple access (WCDMA) system, a general packet radio service (GPRS) system, a long-term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5G system, etc.

FIG. 1 illustrates a wireless communication system 100 applied to the embodiments of the disclosure. The wireless communication system 100 may include a network device 110.

The network device 100 may communicate with a terminal device. The network device 100 may provide communication coverage for a specific geographical area, and may communicate with a terminal device (e.g., UE) in the coverage area. Alternatively, the network device 100 may be a base transceiver station (BTS) in a GSM system or a CDMA system, or a NodeB (NB) in a WCDMA system, or an evolved NodeB (eNB or eNodeB) in an LTE system, or a radio controller in a cloud radio access network (CRAN). Alternatively, the network device may be a relay station, an access point, a vehicle-mounted device, a wearable device, a network-side device in a future 5G network, a network device in a future evolved public land mobile network (PLMN), etc.

The wireless communication system 100 further includes at least one terminal device 120 within the coverage of the network device 110. The terminal device 120 may be mobile or stationary. Alternatively, the terminal device 120 may refer to an access terminal, user equipment (UE), a user unit, a user station, a mobile station, a remote station, a remote terminal, a mobile device, a user terminal, a terminal, a wireless communication device, a user agent or a user device. The access terminal may be a cell phone, a cordless phone, a session initiation protocol (SIP) phone, a wireless local loop (WLL) station, a personal digital assistant (PDA), a hand-held device with a wireless communication function, a computing device or other processing devices connected to a radio modem, a vehicle-mounted device, a wearable device, a terminal device in a future 5G network, a terminal device in a future evolved PLMN, or the like.

Provided in embodiments of the disclosure are a method for communication, a network device and a terminal device. Configuration of a power-saving mode of a terminal device can be determined according to characteristic information of the terminal device.

In a first aspect, provided is a method for communication, including: determining, by a network device, according to characteristic information of a terminal device, configuration information for power saving of the terminal device; and sending, by the network device, the configuration information to the terminal device.

In the embodiment of the disclosure, the network device can determine, according to the characteristic information of the terminal device, the configuration information for power saving of the terminal device, so that the determined configuration information is more suitable for the terminal device, and the power saving demand of the terminal device can be better satisfied.

Alternatively, the characteristic information of the terminal device includes at least one of: subscription information of the terminal device; or service information of the terminal device.

Alternatively, the subscription information of the terminal device includes at least one of: an operation mechanism subscribed by the terminal device; or power saving demand information of the terminal device. Therefore, the network device can determine, according to the subscription information of the terminal device, whether the terminal device is a power-saving mode terminal, that is, whether a first goal of the terminal device is to save power. In this way, the network device may determine, according to a power saving demand of the terminal device, configuration information for power saving of the terminal device, facilitating reducing power consumption of the terminal.

In a possible implementation, the service information of the terminal device includes at least one of: data arrival time interval information of the terminal device, a probability that a value corresponding to the data arrival time interval information occurs, time information corresponding to the data arrival time interval information, and location information corresponding to the data arrival time interval information; frequentness information of data transmission of the terminal device, a probability that a value corresponding to the frequentness information occurs, time information corresponding to the frequentness information, and location information corresponding to the frequentness information; data arrival duration information of the terminal device, a probability that a value corresponding to the data arrival duration information occurs, time information corresponding to the data arrival duration information, and location information corresponding to the data arrival duration information; or a quality of service (QoS) requirement of the terminal device, a probability that a value corresponding to the QoS requirement occurs, time information corresponding to the QoS requirement, and location information corresponding to the QoS requirement.

In a possible implementation, the operation of determining, by the network device, according to the characteristic information of the terminal device, the configuration information for power saving of the terminal device includes: in response to that the terminal device has subscribed a power-saving operation mechanism, determining, by the network device, a discontinuous reception (DRX) cycle of the terminal device to be greater than a first cycle threshold.

In a possible implementation, the operation of determining, by the network device, according to the characteristic information of the terminal device, the configuration information for power saving of the terminal device includes: in response to that the terminal device has subscribed a power-saving operation mechanism, and data transmission of the terminal device is non-frequent, determining, by the network device, a DRX cycle of the terminal device to be greater than a second cycle threshold.

Alternatively, in some embodiments, the network device may also determine the DRX cycle of the terminal device to be greater than the second cycle in response to that data transmission of the terminal device is non-frequent, regardless of whether the terminal device has subscribed a power-saving operation mechanism.

In a possible implementation, determining, by the network device, according to the characteristic information of the terminal device, the configuration information for power saving of the terminal device includes: in response to that the terminal device has subscribed a power-saving operation mechanism, and a data arrival time interval of the terminal device is a first interval, determining, by the network device, a DRX cycle of the terminal device to be smaller than or equal to the first interval.

Alternatively, in some embodiments, the network device may also determine the DRX cycle of the terminal device to be smaller than or equal to the first interval in response to that the data arrival time interval of the terminal device is the first interval, regardless of whether the terminal device has subscribed a power-saving operation mechanism.

In a possible implementation, determining, by the network device, according to the characteristic information of the terminal device, the configuration information for power saving of the terminal device includes: in response to that the terminal device has subscribed a power-saving operation mechanism, and the terminal device has a delay requirement of a first delay in a first period, determining, by the network device, a DRX cycle of the terminal device to be smaller than or equal to the first delay.

Alternatively, in some embodiments, the network device may also determine the DRX cycle of the terminal device to be smaller than or equal to the first delay in response to that the terminal device has the delay requirement of the first delay in the first period, regardless of whether the terminal device has subscribed a power-saving operation mechanism.

In a possible implementation, determining, by the network device, according to the characteristic information of the terminal device, the configuration information for power saving of the terminal device includes: in response to that the terminal device has subscribed a power-saving operation mechanism, and the terminal device has a delay requirement of a second delay in a first region, determining, by the network device, a DRX cycle of the terminal device to be smaller than or equal to the second delay.

Alternatively, in some embodiments, the network device may also determine the DRX cycle of the terminal device to be smaller than or equal to the second delay in response to that the terminal device has the delay requirement of the second delay in the first region, regardless of whether the terminal device has subscribed a power-saving operation mechanism.

In a possible implementation, the power-saving operation mechanism includes: a DRX mechanism, an extended DRX mechanism, and a power saving management (PSM) mechanism.

Alternatively, the service information of the terminal device is acquired by the network device from a subscription server associated with the terminal device.

Alternatively, the service information of the terminal device is determined by the network device according to history service information of the terminal device. Alternatively, the service information of the terminal device is acquired by the network device from an external server.

In a possible implementation, the external server is an application server.

In a possible implementation, the method further includes: sending, by the network device, a first message to the terminal device, wherein the first message is used for notifying the terminal device of a reason for modifying the configuration information.

In a possible implementation, the configuration information for power saving of the terminal device includes at least one of: a DRX cycle of the terminal device; or a wake-up duration of the terminal device.

In a second aspect, provided is a method for communication, including: receiving, by a terminal device, from a network device, configuration information for power saving of the terminal device, wherein the configuration information is determined by the network device according to characteristic information of the terminal device; and performing, by the terminal device, data transmission according to the configuration information.

In a possible implementation, the characteristic information of the terminal device includes at least one of: subscription information of the terminal device; or service information of the terminal device.

In a possible implementation, the subscription information of the terminal device includes at least one of: an operation mechanism subscribed by the terminal device; or a power saving demand of the terminal device.

In a possible implementation, the operation mechanism includes: a discontinuous reception (DRX) mechanism, an extended DRX mechanism, and a power saving management (PSM) mechanism.

In a possible implementation, the service information of the terminal device includes at least one of: data arrival time interval information of the terminal device, a probability that a value corresponding to the data arrival time interval information occurs, time information corresponding to the data arrival time interval information, and location information corresponding to the data arrival time interval information; frequentness information of data transmission of the terminal device, a probability that a value corresponding to the frequentness information occurs, time information corresponding to the frequentness information, and location information corresponding to the frequentness information; data arrival duration information of the terminal device, a probability that a value corresponding to the data arrival duration information occurs, time information corresponding to the data arrival duration information, and location information corresponding to the data arrival duration information; or a quality of service (QoS) requirement of the terminal device, a probability that a value corresponding to the QoS requirement occurs, time information corresponding to the QoS requirement, and location information corresponding to the QoS requirement.

Alternatively, the service information of the terminal device is acquired by the network device from a subscription server associated with the terminal device.

Alternatively, the service information of the terminal device is determined by the network device according to history service information of the terminal device. Alternatively, the service information of the terminal device is acquired by the network device from an external server.

In a possible implementation, the external server is an application server.

In a possible implementation, the method further includes: receiving, by the terminal device, a first message from the network device, wherein the first message is used for notifying the terminal device of a reason for modifying the configuration information.

In a possible implementation, the configuration information for power saving of the terminal device includes at least one of: a DRX cycle of the terminal device; or a wake-up duration of the terminal device.

In a third aspect, provided is a network device for executing the method in the first aspect or any possible implementation of the first aspect. In particular, the network device includes units for executing the method in the first aspect or any possible implementation of the first aspect.

In a fourth aspect, provided is a terminal device, including: a memory, a processor, an input interface and an output interface which are connected through a bus system, wherein the memory is configured to store instructions, and the processor is configured to execute the instructions stored in the memory to perform the method in the first aspect or any possible implementation of the first aspect.

In a fifth aspect, provided is a network device for executing the method in the second aspect or any possible implementation of the second aspect. In particular, the network device includes units for executing the method in the second aspect or any possible implementation of the second aspect.

In a sixth aspect, provided is a terminal device, including: a memory, a processor, an input interface and an output interface which are connected through a bus system, wherein the memory is configured to store instructions, and the processor is configured to execute the instructions stored in the memory to perform the method in the second aspect or any possible implementation of the second aspect.

In a seventh aspect, provided is a computer storage medium for storing computer software instructions for performing the method in the first aspect or any possible implementation of the first aspect, and including a program designed for performing the method.

In an eighth aspect, provided is a computer program product including instructions, wherein the computer program product, when running on a computer, causes the computer to perform the method in the first aspect or any possible implementation of the first aspect.

In a ninth aspect, provided is a computer storage medium for storing computer software instructions to be executed to perform the method in the second aspect or any possible implementation of the second aspect, and including a program designed for performing the method.

In a tenth aspect, provided is a computer program product including instructions, wherein the computer program product, when running on a computer, causes the computer to perform the method in the second aspect or any possible implementation of the second aspect.

FIG. 2 illustrates a schematic flowchart of a method for communication according to an embodiment of the disclosure. As illustrated in FIG. 2, the method 200 includes the following actions.

In S210, a network device determines, according to characteristic information of a terminal device, configuration information for power saving of the terminal device.

In S220, the network device sends the configuration information to the terminal device.

In the embodiment of the disclosure, the network device can determine, according to the characteristic information of the terminal device, the configuration information for power saving of the terminal device, so that the determined configuration information is more suitable for the terminal device, and the power saving demand of the terminal device can be better satisfied.

Alternatively, in embodiments of the disclosure, the characteristic information of the terminal device may be determined according to personalized demands of a user. For example, the characteristic information of the terminal device may be determined based on a user's preference, a subscribed service or the like. Therefore, the characteristic information of the terminal device may be considered as attribute information specific to the terminal device.

Alternatively, in some embodiments, the characteristic information of the terminal device may include at least one of: subscription information of the terminal device, or service information of the terminal device.

Alternatively, the subscription information of the terminal device may be subscription information determined when the terminal device registers with a network. In particular, when registering with the network, the terminal device may inform the network device of power saving demand information of the terminal device. For example, the terminal device informs the network device that the terminal device is a power-saving mode terminal, that is to say, power saving is the first goal for the terminal device based on the premise that fundamental service demands thereof are satisfied.

Alternatively, when registering with the network, the terminal device may also subscribe a power-saving operation mode, such as a discontinuous reception (DRX) mode, an extended DRX (eDRX) mode, a power saving management (PSM) mode. When one of the operation modes is subscribed by the terminal device, the network device may consider that the terminal device is a power-saving mode terminal, that is, power saving is the first goal for the terminal device. Accordingly, the network device may determine corresponding configuration information for power saving of the terminal device. For example, the network device may configure such as a long DRX cycle, a long sleep duration (in other words, opportunity for DRX), or a short wake-up duration (in other words, on duration) for the terminal device, thus facilitating reducing power consumption of the terminal device.

It is to be understood that, in embodiments of the disclosure, power consumption of a terminal device is reduced by discontinuous monitoring of the terminal device in a DRX mode. In an eDRX mode, a monitoring period is extended based on DRX. In a PSM mode, a radio-frequency channel is shut off, and communication operations are stopped.

Therefore, the network device may determine, according to the subscription information of the terminal device, whether the terminal device is a power-saving mode terminal, that is, whether power saving is the first goal for the terminal device. In this way, the network device may determine, according to a power saving demand of the terminal device, configuration information for power saving of the terminal device, facilitating reducing power consumption of the terminal.

Alternatively, in some embodiments, the configuration information for power saving of the terminal device includes at least one of the following of the terminal device: a DRX cycle, an eDRX cycle, a wake-up duration, or a sleep duration.

Alternatively, in some embodiments, the service information of the terminal device includes at least one of the following groups:

data arrival time interval information of the terminal device, a probability that a value corresponding to the data arrival time interval information occurs, time information corresponding to the data arrival time interval information, and location information corresponding to the data arrival time interval information;

frequentness information of data transmission of the terminal device, a probability that a value corresponding to the frequentness information occurs, time information corresponding to the frequentness information, and location information corresponding to the frequentness information;

data arrival duration information of the terminal device, a probability that a value corresponding to the data arrival duration information occurs, time information corresponding to the data arrival duration information, and location information corresponding to the data arrival duration information; or a quality of service (QoS) requirement of the terminal device, a probability that a value corresponding to the QoS requirement occurs, time information corresponding to the QoS requirement, and location information corresponding to the QoS requirement.

Alternatively, in embodiments of the disclosure, the data arrival time interval of the terminal device may be understood as a time interval between arrival of two adjacent pieces of data of the terminal device.

Alternatively, if a large amount of data arrives in a first period, and a large amount of data arrives in a second period after the first period, a time interval between the first period and the second period may also be understood as a data arrival time interval. At this time, data arrival means arrival of a large amount of data.

Alternatively, in embodiments of the disclosure, frequentness information of data transmission of the terminal device may indicate the frequentness of data transmission of the terminal device. For example, the frequentness information of data transmission of the terminal device may indicate whether data transmission of the terminal device is frequent. Alternatively, the frequentness of data transmission of the terminal device may also be divided into a plurality of levels, e.g., frequent, regular, non-frequent, and so on. This is not limited in the embodiments of the disclosure.

Alternatively, in embodiments of the disclosure, the data arrival duration information of the terminal device may be understood as a duration in which a large amount of data arrives. For example, if there is a large amount of data arrives continuously in a third period, the data arrival duration of the terminal device may be the duration of the third period. Alternatively, the duration information may also be understood as data transmission duration information of the terminal device, for example, a duration from arrival of data to completion of transmission of the data.

Alternatively, in embodiments of the disclosure, the quality of service (QoS) of the terminal device may include a delay requirement, a reliability demand, etc. of the terminal device. This is not limited in the embodiments of the disclosure.

Hereinafter, a delay requirement of the terminal device is taken as an example to explain meaning of a probability that a value corresponding to the information occurs, time information corresponding to the information, and location information corresponding to the information.

For example, the terminal device has a delay requirement of 5 minutes, and the probability that the value occurs is 80%. That is to say, the probability that the delay requirement of the terminal device being 5 minutes occurs is 80%. The probability that the network device meets the delay requirement, i.e., the probability that a delay of the terminal device is less than 5 minutes, needs to be greater than or equal to 80%.

For another example, if the terminal device has a delay requirement of 5 minutes during a period from 7:00 to 23:00, and has a delay requirement of 10 minutes during a period from 23:00 to 7:00, the network device should meet the delay requirement that a delay is less than or equal to 5 minutes during the period from 7:00 to 23:00, and the delay requirement that a delay is less than or equal to 10 minutes during the period from 23:00 to 7:00.

For another example, if the terminal device has a delay requirement of 5 minutes corresponding to a first region (e.g., a region where a company is located) and a delay requirement of 10 minutes corresponding to a second region (e.g., a region where a home is located), the network device should meet the delay requirement that a delay is less than or equal to 5 minutes in the first region, and the delay requirement that a delay is less than or equal to 10 minutes in the second region.

Alternatively, in some embodiments, the subscription information of the terminal device may be acquired by the network device from a subscription server associated with the terminal device.

It is to be understood that the subscription information of the terminal device is stored in the subscription server associated with the terminal device. Therefore, when the network device needs to acquire the subscription information of the terminal device, the network device may acquire the stored subscription information of the terminal device from the subscription server associated with the terminal device.

Alternatively, in some embodiments, the service information of the terminal device may be acquired by the network device from the subscription server associated with the terminal device.

In particular, when registering with a network, the terminal device may report the service information of the terminal device to the subscription server, for example, QoS, a data arrival time interval, etc. The subscription server may store the service information of the terminal device. When the network device needs to acquire the service information of the terminal device, the network device may acquire the stored service information of the terminal device from the subscription server associated with the terminal device.

Alternatively, in some embodiments, the service information of the terminal device may be determined by the network device according to history service information of the terminal device.

For example, the network device may make statistics about the history service information of the terminal device. In a particular implementation, the network device may determine the service information of the terminal device according to service transmission conditions in a past period of time. For example, the terminal device may make statistics about information such as frequentness of data transmission, a data arrival time interval and a data arrival duration in a past period of time, so as to determine the service information of the terminal device.

Alternatively, in some embodiments, the service information of the terminal device and/or subscription information of the terminal device may be acquired by the network device from an external server.

Alternatively, the external server may be another device, e.g., an application server, other than the terminal device, the network device, and the subscription server associated with the terminal device. This is not limited in the embodiments of the disclosure.

Alternatively, in some embodiments, action S210 may particularly include that, in response to that the terminal device has subscribed a power-saving operation mechanism, the network device determines a discontinuous reception (DRX) cycle of the terminal device to be greater than a first cycle threshold.

In particular, if the terminal device has subscribed a power-saving operation mechanism, e.g., DRX, eDRX, or PSM, the network device may configure configuration information for power saving of the terminal device. For example, the network device may configure a DRX cycle of the terminal device to be greater than a first cycle threshold, or a sleep duration of the terminal device to be longer than a first duration, or a wake-up duration of the terminal device to be shorter than a second duration, so that the power consumption of the terminal device can be reduced.

Alternatively, in some embodiments, action S210 may include that: in response to that the terminal device has subscribed a power-saving operation mechanism, and data transmission of the terminal device is non-frequent, the network device determines a DRX cycle of the terminal device to be greater than a second cycle threshold.

In particular, if the terminal device has subscribed a power-saving operation mechanism, e.g., DRX, eDRX, or PSM, and data transmission of the terminal device is non-frequent, the network device may configure configuration information for power saving of the terminal device. For example, the network device may configure a DRX cycle of the terminal device to be greater than a second cycle threshold, or a sleep duration of the terminal device to be longer than a third duration, or a wake-up duration of the terminal device to be shorter than a fourth duration, thus facilitating power saving of the terminal device.

Alternatively, in some embodiments, the network device may also determine the DRX cycle of the terminal device to be greater than the second cycle in response to that data transmission of the terminal device is non-frequent, regardless of whether the terminal device has subscribed a power-saving operation mechanism.

Alternatively, in some embodiments, action S210 may include that: in response to that the terminal device has subscribed a power-saving operation mechanism, and a data arrival time interval of the terminal device is a first interval, the network device determines a DRX cycle of the terminal device to be smaller than or equal to the first interval.

For example, if the terminal device has subscribed a power-saving operation mechanism, e.g., DRX, eDRX or PSM, and the data arrival time interval of the terminal device is 10 ms, the network device may configure a DRX cycle of the terminal device to be equal to or less than 10 minutes, e.g., 5 minutes, or a sleep duration of the terminal device to be less than or equal to 10 minutes, thus facilitating power saving of the terminal device.

Alternatively, in some embodiments, the network device may also determine the DRX cycle of the terminal device to be smaller than or equal to the first interval in response to that the data arrival time interval of the terminal device is the first interval, regardless of whether the terminal device has subscribed a power-saving operation mechanism.

Alternatively, in some embodiments, action S210 may include that: in response to that the terminal device has subscribed a power-saving operation mechanism, and the terminal device has a delay requirement of a first delay in a first period, the network device determines a DRX cycle of the terminal device to be smaller than or equal to the first delay.

For example, the terminal device has a delay requirement of 5 minutes in a period from 7:00 to 23:00, and has a delay requirement of 10 minutes in a period from 23:00 to 7:00. The network device may configure a DRX cycle of the terminal device to be less than or equal to 5 minutes in the period from 7:00 to 23:00, or a sleep duration of the terminal device to be less than or equal to 5 minutes in the period from 7:00 to 23:00. The network device may configure a DRX cycle of the terminal device to be less than or equal to 10 minutes in the period from 23:00 to 7:00, or a sleep duration of the terminal device to be less than or equal to 10 minutes in the period from 23:00 to 7:00. Thus the delay requirements of the terminal device may be met.

Alternatively, in some embodiments, the network device may also determine the DRX cycle of the terminal device to be smaller than or equal to the first delay in response to that the terminal device has the delay requirement of the first delay in the first period, regardless of whether the terminal device has subscribed a power-saving operation mechanism.

Alternatively, in some embodiments, action S210 may include that: in response to that the terminal device has subscribed a power-saving operation mechanism, and the terminal device has a delay requirement of a second delay in a first region, the network device determines a DRX cycle of the terminal device to be smaller than or equal to the second delay.

For example, the terminal device has a delay requirement of 5 minutes in a first region (e.g., a region where a company is located), and has a delay requirement of 10 minutes in a second region (e.g., other regions than the first region). The network device may configure a DRX cycle of the terminal device to be less than or equal to 5 minutes or a sleep duration of the terminal device to be less than or equal to 5 minutes, when the terminal device is in the first region. The network device may configure a DRX cycle of the terminal device to be less than or equal to 10 minutes or a sleep duration of the terminal device to be less than or equal to 10 minutes, when the terminal is in the second region. Thus the delay requirements of the terminal device may be met.

Alternatively, in some embodiments, the network device may also determine the DRX cycle of the terminal device to be smaller than or equal to the second delay in response to that the terminal device has the delay requirement of the second delay in the first region, regardless of whether the terminal device has subscribed a power-saving operation mechanism.

Alternatively, in some embodiments, the method 200 may further include that: the network device sends a first message to the terminal device. The first message is used for notifying the terminal device of a reason for modifying the configuration information.

In particular, when the network device modifies the configuration information for power saving of the terminal device, for example, modifying the DRX cycle of the terminal device from 10 ms to 5 ms, the network device may notify the terminal device of a reason for modifying the configuration information. The configuration information may be modified based on for example the service information (e.g., a delay requirement) of the terminal device or the subscription information of the terminal device.

Therefore, the network device may determine, according to the subscription information of the terminal device and the service information of the terminal device, configuration information for power saving of the terminal device. The determined configuration information has finer granularity, and can better satisfy service demands of the terminal device.

The method for communication according to an embodiment of the disclosure is described from the perspective of the network device in conjunction with FIG. 2. A method for communication according to another embodiment of the disclosure will be described from the perspective of the terminal device in conjunction with FIG. 3. It is to be understood that the description made from the terminal device side corresponds to the description made from the network device side. Reference can be made to the preceding for similar description, which will not be described here to avoid repetition.

FIG. 3 illustrates a schematic flowchart of a method 300 for communication according to another embodiment of the disclosure. As illustrated in FIG. 3, the method 300 includes the following actions.

In action S310, a terminal device receives, from a network device, configuration information for power saving of the terminal device. The configuration information is determined by the network device according to characteristic information of the terminal device.

In action S320, the terminal device performs data transmission according to the configuration information.

Alternatively, in some embodiments the characteristic information of the terminal device includes at least one of: subscription information of the terminal device; or service information of the terminal device.

Alternatively, in some embodiments, the subscription information of the terminal device includes at least one of: an operation mechanism subscribed by the terminal device; or a power saving demand of the terminal device.

Alternatively, in some embodiments, the operation mechanism includes: a discontinuous reception (DRX) mechanism, an extended DRX mechanism, and a power saving management (PSM) mechanism.

Alternatively, in some embodiments, the service information of the terminal device includes at least one of: data arrival time interval information of the terminal device, a probability that a value corresponding to the data arrival time interval information occurs, time information corresponding to the data arrival time interval information, and location information corresponding to the data arrival time interval information; frequentness information of data transmission of the terminal device, a probability that a value corresponding to the frequentness information occurs, time information corresponding to the frequentness information, and location information corresponding to the frequentness information; data arrival duration information of the terminal device, a probability that a value corresponding to the data arrival duration information occurs, time information corresponding to the data arrival duration information, and location information corresponding to the data arrival duration information; or a quality of service (QoS) requirement of the terminal device, a probability that a value corresponding to the QoS requirement occurs, time information corresponding to the QoS requirement, and location information corresponding to the QoS requirement.

Alternatively, in some embodiments, the service information of the terminal device is acquired by the network device from the subscription server associated with the terminal device.

Alternatively, in some embodiments, the service information of the terminal device is determined by the network device according to history service information of the terminal device.

Alternatively, in some embodiments, the service information of the terminal device is acquired by the network device from an external server.

Alternatively, in some embodiments, the external server is an application server.

Alternatively, in some embodiments, the method 300 further includes that: the terminal device receives a first message from the network device. The first message is used for notifying the terminal device of a reason for modifying the configuration information.

Alternatively, in some embodiments, the configuration information for power saving of the terminal device includes at least one of: a DRX cycle of the terminal device; or a wake-up duration of the terminal device.

The method embodiment of the disclosure is described above in detailed in conjunction with FIGS. 2 and 3. A device embodiment of the disclosure is described in detail below in conjunction with FIGS. 4 to 7. It is to be understood that the device embodiment corresponds to the method embodiment, and reference can be made to the method embodiment, for similar description.

FIG. 4 illustrates an exemplary block diagram of a network device 400 according to an embodiment of the disclosure. As illustrated in FIG. 4, the network device 400 includes a determination module 410 and a communication module 420.

The determination module 410 is configured to determine, according to characteristic information of a terminal device, configuration information for power saving of the terminal device.

The communication module 420 is configured to send the configuration information to the terminal device.

Alternatively, in some embodiments, the characteristic information of the terminal device includes at least one of: subscription information of the terminal device; or service information of the terminal device.

Alternatively, in some embodiments, the subscription information of the terminal device includes at least one of: an operation mechanism subscribed by the terminal device; or power saving demand information of the terminal device.

Alternatively, in some embodiments, the service information of the terminal device includes at least one of: data arrival time interval information of the terminal device, a probability of a value corresponding to the data arrival time interval information occurs, time information corresponding to the data arrival time interval information, and location information corresponding to the data arrival time interval information; frequentness information of data transmission of the terminal device, a probability that a value corresponding to the frequentness information occurs, time information corresponding to the frequentness information, and location information corresponding to the frequentness information; data arrival duration information of the terminal device, a probability that a value corresponding to the data arrival duration information occurs, time information corresponding to the data arrival duration information, and location information corresponding to the data arrival duration information; or a quality of service (QoS) requirement of the terminal device, a probability that a value corresponding to the QoS requirement occurs, time information corresponding to the QoS requirement, and location information corresponding to the QoS requirement.

Alternatively, in some embodiments, the determination module 410 is specifically configured to: in response to that the terminal device has subscribed a power-saving operation mechanism, determine a discontinuous reception (DRX) cycle of the terminal device to be greater than a first cycle threshold.

Alternatively, in some embodiments, the determination module 410 is further configured to: in response to that the terminal device has subscribed a power saving operation mechanism, and data transmission of the terminal device is non-frequent, determine a DRX cycle of the terminal device to be greater than a second cycle threshold.

Alternatively, in some embodiments, the determination module 410 is further configured to: in response to that the terminal device has subscribed a power saving operation mechanism, and a data arrival time interval of the terminal device is a first interval, determine a DRX cycle of the terminal device to be smaller than or equal to the first interval.

Alternatively, in some embodiments, the determination module 410 is further configured to: in response to that the terminal device has subscribed a power saving operation mechanism, and the terminal device has a delay requirement of a first delay in a first period, determine a DRX cycle of the terminal device to be smaller than or equal to the first delay.

Alternatively, in some embodiments, the determination module 410 is further configured to: in response to that the terminal device has subscribed a power-saving operation mechanism, and the terminal device has a delay requirement of a second delay in a first region, determine a DRX cycle of the terminal device to be smaller than or equal to the second delay.

Alternatively, in some embodiments, the power-saving operation mechanism includes: a discontinuous reception (DRX) mechanism, an extended DRX mechanism, and a power saving management (PSM) mechanism.

Alternatively, in some embodiments, the service information of the terminal device is acquired by the network device from a subscription server associated with the terminal device. Alternatively, the service information of the terminal device is determined by the network device according to history service information of the terminal device. Alternatively, the service information of the terminal device is acquired by the network device from an external server.

Alternatively, the external server is an application server.

Alternatively, in some embodiments, the communication module 420 is further configured to: send a first message to the terminal device. The first message is used for notifying the terminal device of a reason for modifying the configuration information.

Alternatively, in some embodiments, the configuration information for power saving of the terminal device includes at least one of: a DRX cycle of the terminal device; or a wake-up duration of the terminal device.

It is to be understood that the network device 400 in the embodiment of the disclosure may correspond to the network device in the method embodiment of the disclosure, and the above and other operations and/or functions of various units in the network device 400 are aimed at realizing processes corresponding to the network device in the method 200 as illustrated in FIG. 2. This will not be described here for simplicity.

Figure 5:
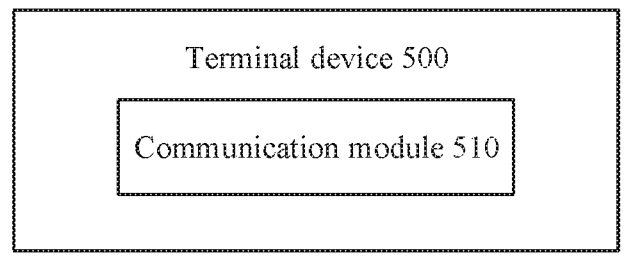
FIG. 5 illustrates an exemplary block diagram of a terminal device according to an embodiment of the disclosure.

FIG. 5 illustrates an exemplary block diagram of a terminal device according to an embodiment of the disclosure. The terminal device 500 as illustrated in FIG. 5 includes a communication unit 510.

The communication module 510 is configured to receive, from a network device, configuration information for power saving of the terminal device, and perform data transmission according to the configuration information. The configuration information is determined by the network device according to characteristic information of the terminal device.

Alternatively, in some embodiments, the characteristic information of the terminal device includes at least one of: subscription information of the terminal device, or service information of the terminal device.

Alternatively, in some embodiments, the subscription information of the terminal device includes at least one of: an operation mechanism subscribed by the terminal device, or a power saving demand of the terminal device.

Alternatively, in some embodiments, the operation mechanism includes: a discontinuous reception (DRX) mechanism, an extended DRX mechanism, and a power saving management (PSM) mechanism.

Alternatively, in some embodiments, the service information of the terminal device includes at least one of: data arrival time interval information of the terminal device, a probability that a value corresponding to the data arrival time interval information occurs, time information corresponding to the data arrival time interval information, and location information corresponding to the data arrival time interval information; frequentness information of data transmission of the terminal device, a probability that a value corresponding to the frequentness information occurs, time information corresponding to the frequentness information, and location information corresponding to the frequentness information; data arrival duration information of the terminal device, a probability that a value corresponding to the data arrival duration information occurs, time information corresponding to the data arrival duration information, and location information corresponding to the data arrival duration information; or a quality of service (QoS) requirement of the terminal device, a probability that a value corresponding to the QoS requirement occurs, time information corresponding to the QoS requirement, and location information corresponding to the QoS requirement.

Alternatively, in some embodiments, the service information of the terminal device is acquired by the network device from a subscription server associated with the terminal device. Alternatively, the service information of the terminal device is determined by the network device according to history service information of the terminal device. Alternatively, the service information of the terminal device is acquired by the network device from an external server.

Alternatively, in some embodiments, the external server is an application server.

Alternatively, in some embodiments, the communication module 510 is further configured to receive a first message from the network device. The first message is used for notifying the terminal device of a reason for modifying the configuration information.

Alternatively, in some embodiments, the configuration information for power saving of the terminal device includes at least one of: a DRX cycle of the terminal device, or a wake-up duration of the terminal device.

In particular, the terminal device 500 may correspond to (for example, may be configured to be) the terminal device described in the method 300 above. Moreover, modules or units in the terminal device 500 are configured to execute the respective actions or processing processes executed by the terminal device in the method 300 above. Detailed description will be omitted here to avoid redundancy.

Figure 6:
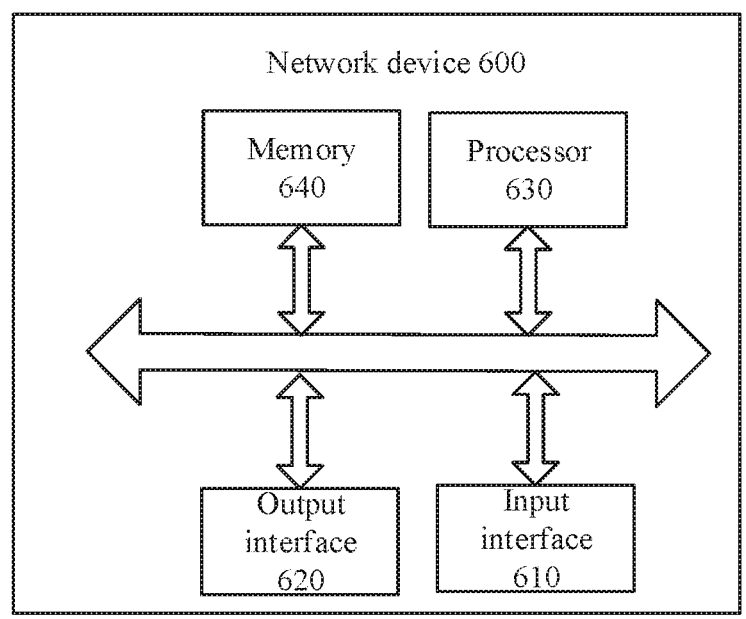
FIG. 6 illustrates an exemplary block diagram of a network device according to another embodiment of the disclosure.

As illustrated in FIG. 6, a network device 600 is further provided in embodiments of the disclosure. The network device 600 may be the network device 400 as illustrated in FIG. 4, and can execute actions corresponding to the network device in the method 200 as illustrated in FIG. 2. The network device 600 includes an input interface 610, an output interface 620, a processor 630 and a memory 640 which are connected through a bus system. The memory 640 is configured to store a program, instructions or codes. The processor 630 is configured to execute the program, instructions or codes in the memory 640 so as to: control the input interface 610 to receive a signal, control the output interface 620 to transmit a signal, and complete actions in the method embodiment above.

It is to be understood that, in embodiments of the disclosure, the processor 630 may be a central processing unit (CPU). The processor 630 may also be other general-purpose processors, data signal processors (DSPs), application-specific circuits (ASICs), field programmable gate array (FPGAs) or other programmable logic devices, discrete gates or transistor logic devices, discrete hardware components, etc. The general-purpose processor may be a microprocessor, or the processor may also be any conventional processor or the like.

The memory 640 may include a read-only memory and a random-access memory, and provides instructions and data to the processor 630. The memory 640 may also include a non-volatile random-access memory. For example, the memory 640 may also store information about a device type.

During implementation, actions of the method above may be completed by an integrated logic circuit in hardware or instructions in a software form in the processor 630. Actions of the method disclosed in the embodiments of the disclosure may be embodied to be executed by a hardware processor, or by a combination of hardware and software modules in the processor. The software module may be located in a storage medium mature in the art such as a random memory, a flash disk, a read-only memory, a programmable read-only memory, an electrically erasable programmable memory, or a register. The storage medium is in the memory 640, and the processor 630 reads information from the memory 640 to complete the actions of the method above in combination with hardware thereof. This will not be described in detail to avoid repetition.

In a particular implementation, the determination module 410 included in the network device 400 as illustrated in FIG. 4 may be realized by the processor 630 in FIG. 6. The communication module 420 included in the network device 400 as illustrated in FIG. 4 may be realized by the input interface 610 and the output interface 620 in FIG. 6.

Figure 7:
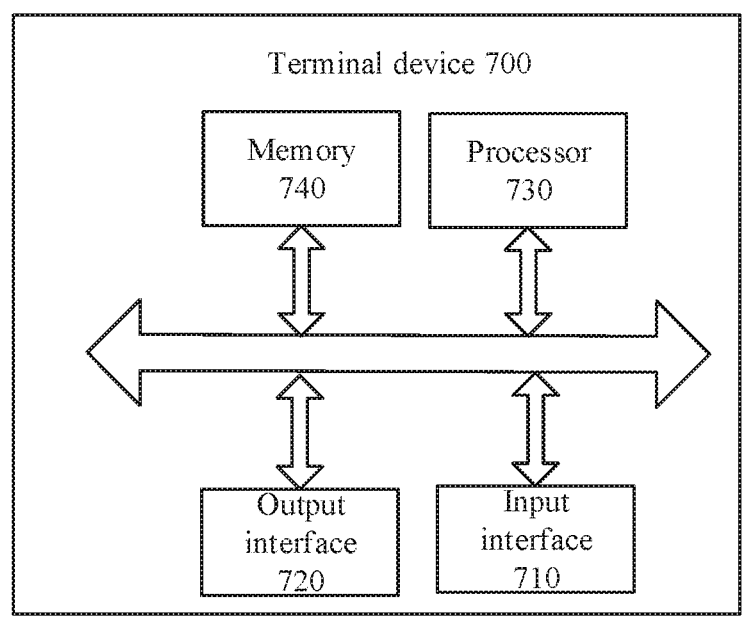
FIG. 7 illustrates an exemplary block diagram of a terminal device according to another embodiment of the disclosure.

As illustrated in FIG. 7, further provided in embodiments of the disclosure is a terminal device 700. The terminal device 700 may be the terminal device 500 as illustrated in FIG. 5, and can perform the actions corresponding to the terminal device in the method 300 in FIG. 3. The terminal device 700 includes an input interface 710, an output interface 720, a processor 730 and a memory 740 which are connected through a bus system. The memory 740 is configured to store a program, instructions or codes. The processor 730 is configured to execute the program, instructions or codes in the memory 740 so as to: control the input interface 710 to receive a signal, control the output interface 720 to transmit a signal, and complete actions in the method embodiments above.

It is to be understood that, in embodiments of the disclosure, the processor 730 may be a central processing unit (CPU). The processor 730 may also be other general-purpose processors, data signal processors (DSPs), application-specific circuits (ASICs), field programmable gate array (FPGAs) or other programmable logic devices, discrete gates or transistor logic devices, discrete hardware components, etc. The general-purpose processor may be a microprocessor, or the processor may also be any conventional processor or the like.

The memory 740 may include a read-only memory and a random access memory, and provides instructions and data to the processor 730. The memory 740 may also include a non-volatile random access memory. For example, the memory 740 may also store information of a device type.

During implementation, actions of the method above may be completed by an integrated logic circuit in hardware or instructions in a software form in the processor 730. Actions of the method disclosed in the embodiments of the disclosure may be embodied to be executed by a hardware processor, or by a combination of hardware and software modules in the processor. The software module may be located in a storage medium mature in the art such as a random memory, a flash disk, a read only memory, a programmable read-only memory, an electrically erasable programmable memory, or a register. The storage medium is in the memory 740, and the processor 730 reads information from the memory 740 to complete the actions of the method above in combination with hardware thereof. This will not be described in detail to avoid repetition.

In a particular implementation, the communication module 510 included in the terminal device 500 as illustrated in FIG. 5 may be realized by the input interface 710 and the output interface 720 in FIG. 7.

Further provided in embodiments of the disclosure is a computer-readable storage medium stored with one or more programs therein. The one or more programs include instructions which, when executed by a portable electronic device including multiple applications, enable the portable electronic device to perform the method according to the embodiments illustrated in FIG. 2 and FIG. 3.

Further provided in embodiments of the disclosure is a computer program including instructions. The computer program, when executed by a computer, enables the computer to execute corresponding processes of the method according to the embodiments illustrated in FIG. 2 and FIG. 3.

It may be appreciated by those of ordinary skilled in the art that units and algorithm steps in each example described in combination with the embodiments disclosed herein may be realized by electronic hardware, or a combination of computer software and electronic hardware. Whether these functions are realized in the form of hardware or software depends on specific application of the technical solution and constraint conditions in design. Professionals may realize the described functions in different approaches for each particular application, but such realization should not be construed as exceeding the scope of the disclosure.

Those skilled in the art may clearly understand that the particular operation of the system, device and units described above may refer to the corresponding actions in the method embodiment above, which will not be described here, for convenience and simplicity of description.

It is to be understood that, in the embodiments provided in the disclosure, the disclosed system, device and method may be realized in other means. For example, the device embodiment described above is merely exemplary. For example, the division of units is merely division of logical functions, and there may be other ways of division in actual implementation. For example, multiple units or components may be combined or integrated into another system, or some features may be neglected or not executed. Additionally, the displayed or discussed mutual coupling or direct coupling or communication connection may be realized through some interfaces, and indirect coupling or communication connections between devices or units may be electrical, mechanical or other forms.

Units described as separate parts therein may or may not be physically separated, and parts displayed as units may or may not be physical units, and namely may be located in the same place or may also be distributed to multiple network units. Some or all of the units may be selected according to actual requirements, to realize the purpose of the solution of the embodiment.

Furthermore, functional units in each embodiment of the disclosure may be integrated into a processing unit, or may exist physically alone, or two or more of the units may be integrated into one.

The functions, when embodied in form of software functional units and sold or used as an independent product, may be stored in a computer-readable storage medium. Based on such understanding, the technical solution of the disclosure in essence or in part contributing to the related art, or part of the technical solution may be embodied in the form of a software product. The computer software product is stored in a storage medium and includes several instructions to enable a computer device (which may be a personal computer, a server, a network device or the like) to execute all or some actions of the method according to various embodiments of the disclosure. The above storage medium includes various mediums that can storage program codes, such as a USB flash disk, a read-only memory (ROM), a random access memory (RAM), a magnetic disc or an optical disk.

The above are merely detailed description of the disclosure, but the scope of protection of the disclosure is not limited thereto. Any change or replacement that would easily occur to those skilled in the art based on the technical solution disclosed in the disclosure should fall within the scope of protection of the disclosure. Therefore, the scope of protection of the disclosure should be limited by the appended claims.

The invention claimed is:

1. A method for communication, comprising:
   determining, by a network device, according to characteristic information of a terminal device, configuration information for power saving of the terminal device, wherein the characteristic information of the terminal device comprises subscription information of the terminal device and service information of the terminal device, and the subscription information of the terminal device comprises power saving demand information of the terminal device; and
   sending, by the network device, the configuration information to the terminal device,
   wherein the service information of the terminal device comprises: data arrival time interval information of the terminal device, a probability that a value corresponding to the data arrival time interval information occurs, time information corresponding to the data arrival time interval information, and location information corresponding to the data arrival time interval information.

2. The method according to claim 1, wherein the service information of the terminal device further comprises at least one of:
   frequentness information of data transmission of the terminal device, a probability that a value corresponding to the frequentness information occurs, time information corresponding to the frequentness information, and location information corresponding to the frequentness information;
   data arrival duration information of the terminal device, a probability that a value corresponding to the data arrival duration information occurs, time information corresponding to the data arrival duration information, and location information corresponding to the data arrival duration information; or
   a quality of service (QoS) requirement of the terminal device, a probability that a value corresponding to the QoS requirement occurs, time information corresponding to the QoS requirement, and location information corresponding to the QoS requirement.

3. The method according to claim 1, wherein the service information of the terminal device is acquired by the network device from an external server.

4. The method according to claim 1, wherein the configuration information for power saving of the terminal device comprises at least one of:
   a DRX cycle of the terminal device; or
   a wake-up duration of the terminal device.

5. The method according to claim 1, wherein determining, by the network device, according to the characteristic information of the terminal device, the configuration information for power saving of the terminal device comprises:
   in response to that the terminal device has subscribed a power-saving operation mechanism, and the terminal device has a delay requirement of a second delay in a first region, determining, by the network device, a DRX cycle of the terminal device to be smaller than or equal to the second delay.

6. A method for communication, comprising:
   receiving, by a terminal device, from a network device, configuration information for power saving of the terminal device, wherein the configuration information is determined by the network device according to characteristic information of the terminal device, the characteristic information of the terminal device comprises subscription information of the terminal device and service information of the terminal device, and the subscription information of the terminal device comprises power saving demand information of the terminal device; and performing, by the terminal device, data transmission according to the configuration information, wherein the service information of the terminal device comprises: data arrival time interval information of the terminal device, a probability that a value corresponding to the data arrival time interval information occurs, time information corresponding to the data arrival time interval information, and location information corresponding to the data arrival time interval information.

7. The method according to claim 6, wherein the service information of the terminal device further comprises at least one of:

frequentness information of data transmission of the terminal device, a probability that a value corresponding to the frequentness information occurs, time information corresponding to the frequentness information, and location information corresponding to the frequentness information;

data arrival duration information of the terminal device, a probability that a value corresponding to the data arrival duration information occurs, time information corresponding to the data arrival duration information, and location information corresponding to the data arrival duration information; or a quality of service (QoS) requirement of the terminal device, a probability that a value corresponding to the QoS requirement occurs, time information corresponding to the QoS requirement, and location information corresponding to the QoS requirement.

8. The method according to claim 6, wherein the service information of the terminal device is acquired by the network device from an external server.

9. The method according to claim 6, wherein the configuration information for power saving of the terminal device comprises at least one of:

a DRX cycle of the terminal device; or a wake-up duration of the terminal device.

10. The method according to claim 6, wherein in response to that the terminal device has subscribed a power-saving operation mechanism, and the terminal device has a delay requirement of a second delay in a first region, a DRX cycle of the terminal device is determined by the network device to be smaller than or equal to the second delay.

11. A network device, comprising:

a processor, configured to determine, according to characteristic information of a terminal device, configuration information for power saving of the terminal device, wherein the characteristic information of the terminal device comprises subscription information of the terminal device and service information of the terminal device, and the subscription information of the terminal device comprises power saving demand information of the terminal device; and an output interface, configured to send the configuration information to the terminal device, wherein the service information of the terminal device comprises: data arrival time interval information of the terminal device, a probability that a value corresponding to the data arrival time interval information occurs, time information corresponding to the data arrival time interval information, and location information corresponding to the data arrival time interval information.

12. The network device according to claim 11, wherein the service information of the terminal device further comprises at least one of:

frequentness information of data transmission of the terminal device, a probability that a value corresponding to the frequentness information occurs, time information corresponding to the frequentness information, and location information corresponding to the frequentness information;

data arrival duration information of the terminal device, a probability that a value corresponding to the data arrival duration information occurs, time information corresponding to the data arrival duration information, and location information corresponding to the data arrival duration information; or a quality of service (QoS) requirement of the terminal device, a probability that a value corresponding to the QoS requirement occurs, time information corresponding to the QoS requirement, and location information corresponding to the QoS requirement.

13. The network device according to claim 11, wherein the service information of the terminal device is acquired by the network device from an external server.

14. The network device according to claim 11, wherein the configuration information for power saving of the terminal device comprises at least one of:

a DRX cycle of the terminal device; or a wake-up duration of the terminal device.

15. The network device according to claim 11, wherein the processor is further configured to:

in response to that the terminal device has subscribed a power-saving operation mechanism, and the terminal device has a delay requirement of a second delay in a first region, determine a DRX cycle of the terminal device to be smaller than or equal to the second delay.

16. A terminal device, comprising:

an input interface, configured to receive, from a network device, configuration information for power saving of the terminal device, wherein the configuration information is determined by the network device according to characteristic information of the terminal device, the characteristic information of the terminal device comprises subscription information of the terminal device and service information of the terminal device, and the subscription information of the terminal device comprises power saving demand information of the terminal device; and perform data transmission according to the configuration information, wherein the service information of the terminal device comprises: data arrival time interval information of the terminal device, a probability that a value corresponding to the data arrival time interval information occurs, time information corresponding to the data arrival time interval information, and location information corresponding to the data arrival time interval information.

17. The terminal device according to claim 16, wherein the service information of the terminal device further comprises at least one of:

frequentness information of data transmission of the terminal device, a probability that a value corresponding to the frequentness information occurs, time information corresponding to the frequentness information, and location information corresponding to the frequentness information;

data arrival duration information of the terminal device, a probability that a value corresponding to the data arrival duration information occurs, time information corresponding to the data arrival duration information, and location information corresponding to the data arrival duration information; or a quality of service (QoS) requirement of the terminal device, a probability that a value corresponding to the QoS requirement occurs, time information corresponding to the QoS requirement, and location information corresponding to the QoS requirement.

18. The terminal device according to claim 16, wherein the service information of the terminal device is acquired by the network device from an external server.

19. The terminal device according to claim 16, wherein the configuration information for power saving of the terminal device comprises at least one of:

a DRX cycle of the terminal device; or a wake-up duration of the terminal device.

20. The terminal device according to claim 16, wherein in response to that the terminal device has subscribed a power-saving operation mechanism, and the terminal device has a delay requirement of a second delay in a first region, a DRX cycle of the terminal device is determined by the network device to be smaller than or equal to the second delay.

\* \* \* \* \*